Sept. 8, 1942. W. H. CUTTINO 2,295,388
AUTOMATIC CONTROL SYSTEM FOR CAPACITORS
Filed Oct. 26, 1939
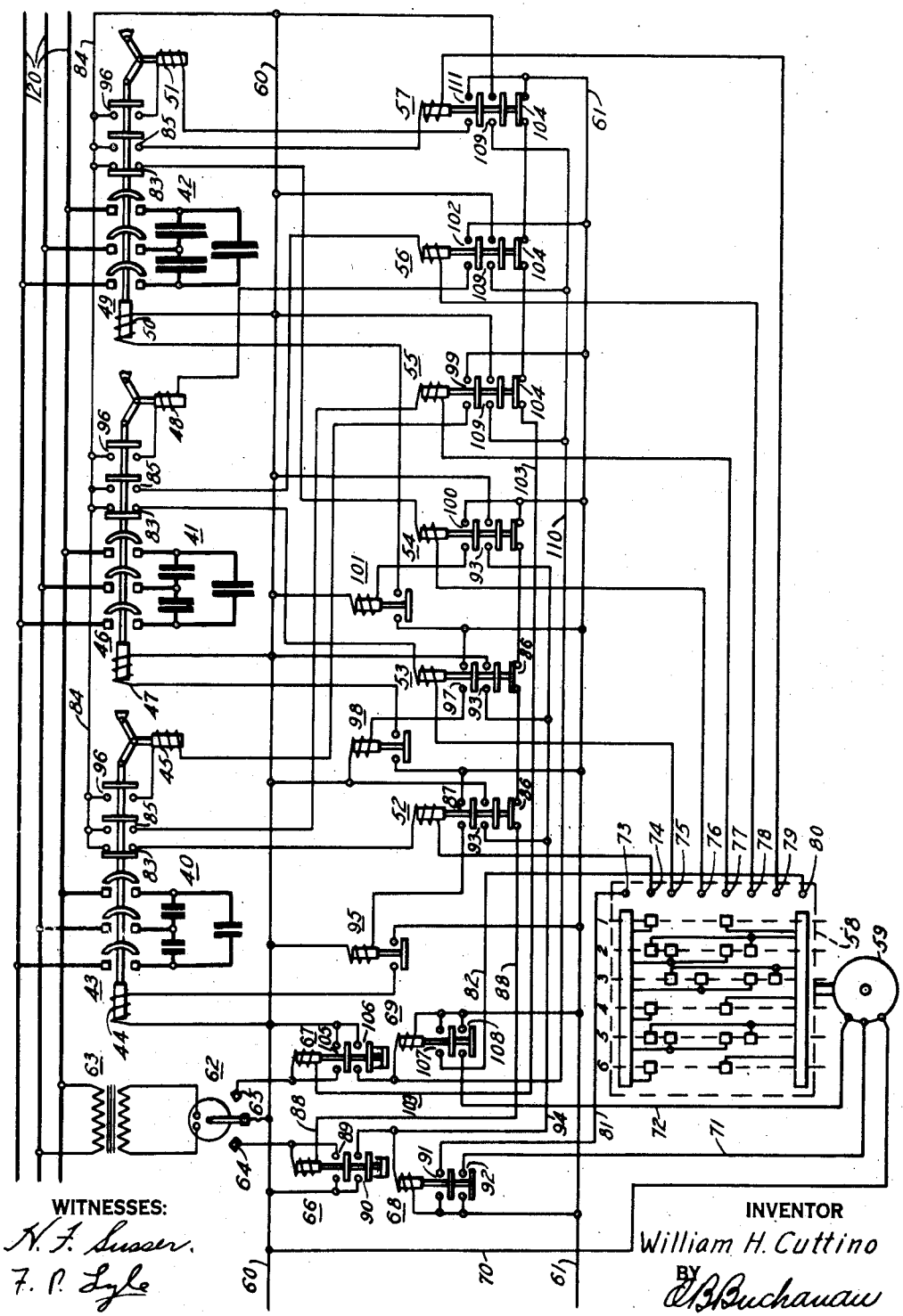
WITNESSES:
N. F. Susser.
F. C. Lyle
INVENTOR
William H. Cuttino
BY
O. B. Buchanan
ATTORNEY Patented Sept. 8, 1942

2,295,388

UNITED STATES PATENT OFFICE 2,295,388

AUTOMATIC CONTROL SYSTEM FOR CAPACITORS

William H. Cuttino, Forest Hills, Pa., assignor to Westinghouse Electric & Manufacturing Company, East Pittsburgh, Pa., a corporation of Pennsylvania Application October 26, 1939, Serial No. 301,435

6 Claims. (Cl. 172—246)

The present invention relates to power factor correction on alternating current transmission or distribution lines, and more particularly to a system for automatically controlling the connection of capacitors to such lines for correcting the power factor.

Practically all types of loads which may be connected to a transmission or distribution system are inductive and cause a lagging line current and a low power factor. For this reason, it has become general practice to connect capacitors to such systems in order to introduce a leading component of line current to compensate the reactive component of the current caused by the inductive load, and thus to improve the power factor and reduce the resultant line current. If the load is fairly constant, the amount of capacitance needed to obtain the desired compensation can be readily determined and the necessary capacitors permanently connected to the line. In cases where the load may vary over a wide range, however, this arrangement is not entirely satisfactory since it provides the desired compensation for only one value of load, and the system is either over-compensated or under-compensated for other loads. It is desirable in such cases to provide a plurality of capacitors or capacitor banks and connect them to the line or disconnect them from it as the load changes in order to maintain the desired compensation and keep the power factor high at all times. This also tends to keep the line voltage reasonably constant.

The object of the present invention is to provide automatic means for changing the amount of capacitance connected to an alternating current transmission or distribution system in accordance with changes in the load.

More specifically, the object of the invention is to provide a control system for automatically controlling a plurality of capacitors or groups of capacitors to connect them to a transmission or distribution system and to disconnect them from it in accordance with changes in load so as to maintain a high power factor under all conditions of load.

A further object of the invention is to provide automatic means for controlling a plurality of capacitors or groups of capacitors to connect them to the line in a predetermined sequence as the load increases and to disconnect them from the line in the reverse sequence as the load decreases.

A still further object of the invention is to provide an automatic system for controlling a plurality of capacitor banks of different capacities to connect them to the line first individually and then in combination in a predetermined sequence as the load increases and to disconnect them in the reverse sequence as the load decreases, so as to provide a number of different values of capacitance which are automatically connected to the line as required by the load.

The invention is preferably carried out by providing a control device which is actuated in accordance with changes in the load and which controls the operation of individual switches or contactors to connect the capacitor banks to the line as required. The control device may be actuated in response to changes in the power factor or in any other electrical condition of the system which is affected by changes in the load. In many cases it is desirable to actuate the control device in response to changes in the line voltage, since changes in the load current produce a corresponding change in the voltage drop in the line, and changes in the line voltage at any point may therefore be taken as an indication of changes in load. Thus, the control system operates to maintain the desired compensation for the reactive component of the load over a wide range of variation of load and keeps the power factor high. This control system may also be used as a voltage regulator in some cases since it tends to keep the resultant line current and therefore the line voltage drop approximately constant.

The invention will be more fully understood from the following detailed description, taken in connection with the accompanying drawing, in which the single figure is a wiring diagram showing a preferred embodiment of the invention.

The embodiment of the invention shown in the drawing is particularly suitable for applications where the load may vary over a wide range and where a relatively large amount of capacitance is required. This figure shows a plurality of capacitor banks 40, 41 and 42 connected to a transmission or distribution line 120. Each capacitor bank may consist of a plurality of individual capacitor units connected in delta, as shown, but either a single three-phase unit of suitable capacity or a plurality of individual units connected together for connection to the line may be used, and the term "capacitor bank" is to be understood as meaning either an individual capacitor unit or a group of units connected together. The capacitor bank 40 is connected to the line through a switch or circuit breaker 43 of any suitable type, having a closing coil 44 and a trip coil 45. Similarly, the capacitor bank 41 is connected to the line through a circuit breaker 46, having a closing coil 47 and a trip coil 48, and the capacitor bank 42 is connected to the line through a circuit breaker 49 having a closing coil 50 and a trip coil 51.

In this embodiment of the invention, the capacitor banks are preferably of different capacities. Thus, the capacitor bank 41 preferably has twice the capacity of the bank 40, and the capacitor bank 42 preferably has three times the capacity of the bank 40. With this relation of the capacities of the individual capacitor banks, a number of different values of capacitance may be obtained and connected to the line as required by the load. Thus, the capacitor banks are first connected to the line individually, one after the other in the order of increasing capacity as the load increases, and are then connected two at a time in combinations of increasing capacity and finally all three are connected. Thus a large number of values of capacitance are obtained and a minimum of control equipment is required. The capacitors are disconnected from the line in the reverse sequence if the load decreases.

The operation of the circuit breakers 43, 46 and 49 is controlled by means of relays. Thus, closing relays 52, 53 and 54 are provided for the circuit breakers 43, 46 and 49, respectively, and each of these relays is adapted when energized to cause energization of the closing coil of the corresponding circuit breaker. Similarly, tripping of each of the circuit breakers 43, 46 and 49 is controlled by tripping relays 55, 56 and 57, respectively. Each of these relays is adapted when energized to cause energization of the trip coil of the corresponding circuit breaker.

The energization of the relays 52 to 57 inclusive, in a predetermined sequence, to effect switching of the capacitor banks in the desired manner, is controlled by a drum controller 58 which is driven by a reversible electric motor 59. The motor 59 is supplied from a suitable source of auxiliary voltage, indicated by the lines 60 and 61, which may be obtained from the line 120 through a transformer, if desired, or from any other suitable and reliable source. The operation of the motor 59 and controller 58 is controlled by means of a contact-making voltmeter 62 which is connected across one phase of the line 120 through a potential transformer 63. It will be understood that instead of a contact-making voltmeter any other suitable device responsive to an electrical condition of the line, such as a voltage relay, current relay or contact-making power factor meter, may be used. The contact-making voltmeter 62 is arranged to close its contacts 64 when the line voltage is below a predetermined value and to close its contacts 65 when the line voltage is above a predetermined value. Closing of the contacts 64 and 65 energizes time delay relays 66 or 67, respectively, which, in turn, energize auxiliary relays 68 and 69 which actuate the motor 59 and controller 58. The motor 59 may be any suitable type of reversible single-phase motor, having a lead 70 connected to the line 60 and leads 71 and 72 which are connected to the line 61 by the relays 68 and 69, respectively, to cause the motor to rotate in one direction or the other. Limit switches may be connected in the leads 71 and 72 to stop the motor when the controller 58 has reached its limit of rotation in either direction.

The controller 58 has a plurality of stationary contacts 73 to 80, inclusive, which are arranged to be engaged by the conducting segments on the rotating drum. The stationary contacts 73 and 80 are connected to the relays 68 and 69, respectively, by conductors 81 and 82. The contacts 74, 75 and 76 are connected to the operating coils of the closing relays 52, 53 and 54, respectively, while the contacts 77, 78 and 79 are connected to the operating coils of the tripping relays 55, 56 and 57, respectively. The other end of the operating coil of each of the relays 52, 53 and 54 is connected through normally closed auxiliary contacts 83 on the corresponding circuit breaker to a conductor 84 and thence to the line 60. The operating coils of the relays 55, 56 and 57 are connected through normally open auxiliary contacts 85 on the corresponding circuit breakers to the conductor 84 and the line 60.

The operation of this system is as follows. Assuming that none of the capacitors is connected to the line, all of the relays will be in their deenergized positions and the controller 58 in its initial position, as shown. If the line voltage now decreases, as the result of an increase in load, the contact-making voltmeter 62 will close its contacts 64 and complete a circuit from the line 60, through the operating coil of the time delay relay 66, conductor 83, and contacts 86 of each of the relays 52, 53 and 54 in series, to the line 61. The relay 66 is thus energized and after a suitable time interval, which prevents operation of the system on momentary voltage disturbances, it closes its contacts. Closing of the contacts 89 completes an obvious sealing circuit which holds the relay in, while closing of the contacts 90 completes an obvious circuit through the operating coil of the relay 68. This relay is, accordingly, energized and closes its contacts. Closing of the contacts 91 connects the contact 73 of the controller 58 to the line 61 through conductor 81, while closing of the contacts 92 connects the lead 71 of the motor 59 to the line 61 and causes the motor to start. This rotates the controller 58 in the direction to engage its segments with the stationary contacts, and as soon as it reaches its first position, a circuit is completed from the line 61 through the relay contacts 91, conductor 81, contact 73, the controller segments, and contact 74, to the operating coil of the relay 52, which is connected to the line 60 as previously described. This relay is, accordingly, energized. Energization of the relay 52 causes the contact 86 to open, interrupting the circuit to the relay 66 and deenergizing it. Simultaneously the contacts 93 are closed, completing a circuit from the line 60 through the conductor 94 to the relay 68 to maintain it energized. The relay contacts 87 complete an obvious circuit from the line 61 through the operating coil of a contactor 95 which immediately closes its contacts, completing an obvious circuit for energizing the closing coil 44 of the circuit breaker 43, causing the breaker to close to connect the capacitor bank 40 to the line 120. When the breaker closes, it opens the auxiliary contacts 83, deenergizing the relay 52, and also closes the auxiliary contacts 85 and 96, which sets up a circuit permitting energization of the trip coil 45, as will appear later. Deenergization of the relay 52 causes the contacts 93 to open and deenergize the relay 68, stopping the motor.

If the line voltage remains low, or if it again decreases due to an increase in load, so that the contacts 64 are again closed, the relays 66 and 68 will be successively energized as previously described, and the motor 59 will start and move the controller 58 to its second position. In this position, the relays 53 and 55 are energized through the contacts 75 and 77, conductor 81 and relay contacts 91. These two relays will, therefore, close their contacts. The relay 53 has contacts 86 and 93 corresponding to those of the relay 52. Closing the contacts 93 completes a circuit to maintain the relay 68 energized, while opening of the contacts 86 deenergizes the relay 66. At the same time the contacts 97 close and energize the contactor 98 which completes a circuit to the closing coil 47 of the circuit breaker 46, causing it to close and connect the capacitor bank 41 to the line. The breaker 46 has auxiliary contacts 83, 85 and 96 corresponding to those of the breaker 43 and performing the same functions. The relay 55 is also energized at the same time since the contacts 85 of the breaker 43 are now closed. This relay therefore closes its contacts 99 which complete a circuit through the trip coil 45 and contacts 96 of the circuit breaker 43, causing it to open and disconnect the capacitor bank 40 from the line. This also opens the contacts 85 and 96, deenergizing the relay 55 and coil 45. It will be seen that the capacitor bank 41, having twice the capacity of the bank 40, is now connected to the line.

If the line voltage still remains low, or if it again drops, the contacts 64 are closed and the relays 66 and 68 are again energized and the controller is moved to its third position in the same manner as previously described. In this position the relays 54 and 56 are energized through the contacts 76 and 78. Energization of the relay 54 causes it to open its contacts 86 to deenergize the relay 66, and to close its contacts 93, corresponding to those of the relays 52 and 53, to maintain the relay 68 energized. Closing of the contacts 100 completes a circuit to the operating coil of the contactor 101, which closes its contacts and completes a circuit to energize the closing coil 50 of the circuit breaker 49, causing it to close and connect the capacitor bank 42 to the line 120. The breaker 49 has auxiliary contacts 83, 85 and 96 corresponding to those of the breakers 43 and 46 and performing the same functions of deenergizing the closing relay and setting up the tripping circuits for the breaker. Simultaneously, the relay 56 is energized through the contacts 85 of the closed circuit breaker 46, and it closes its contacts 102 to energize the trip coil 48 of the circuit breaker 46 and cause the breaker to open and disconnect the capacitor bank 41 from the line. Thus, the capacitor bank 42 of largest capacity is now connected to the line and the other two are disconnected.

If the voltage still remains low or if it again decreases, the controller 58 is moved to its fourth position in the manner previously described, and the relay 52 is energized through the contact 74. Energization of this relay causes the circuit breaker 43 to be closed, in the manner described above, and connects the capacitor bank 40 to the line so that the capacitor banks 40 and 42 are both connected to the line to give still larger capacity. Closing of the breaker 43 causes deenergization of the relays, as previously described.

If the line voltage is still low or if the load again increases so that the voltage drops, the controller 58 is moved to its fifth position in which the relays 53 and 55 are energized through the contacts 75 and 77. As previously described, energization of the relay 53 causes the circuit breaker 46 to close, while energization of the relay 55 causes the circuit breaker 43 to open, so that the capacitor banks 41 and 42 are now both connected to the line 120, giving a combination of greater capacity.

If the load increases still further, or if the line voltage remains low, the controller 58 is moved to the sixth position in which the relay 52 is energized to cause the circuit breaker 43 to be closed, thus again connecting the capacitor bank 40 to the line 120 so that all three banks are now connected, giving the combination of greatest capacity.

It should now be clear that the operation of the system as the load increases is to connect the capacitor banks successively, one at a time, in the order of increasing capacity, and then to connect them in combinations of increasing capacity until finally all three capacitor banks are connected to the line. In this way a large number of different values of capacity are obtained which are connected to the line as required by successively energizing the various closing and tripping relays in a predetermined sequence.

The operation of the system to decrease the capacity connected to the line in case of decreasing load is the reverse of that just described. With all three capacitor banks connected to the line and the controller 58 in its final position, if the line voltage increases, the contact-making voltmeter 62 will close its contacts 65. This completes a circuit from the line 60 through the operating coil of the time delay relay 67, conductor 103, and contacts 104 of the relays 55, 56 and 57 in series, to the line 61. The relay 67 is thus energized and after a suitable time delay to prevent operation on momentary voltage disturbances, it closes its contacts. Closing of the contacts 105 completes an obvious sealing circuit to hold the relay in, while closing the contacts 106 completes a circuit to energize the operating coil of the relay 69. Closing of the contacts 107 of the relay 69 completes a circuit from the contact 80 of the controller 58 through conductor 82 to the line 61, while closing of the contacts 108 connects the lead 72 of the motor 59 to the line 61 and starts the motor rotating in the reverse direction. This moves the controller 58 from its extreme position back to the sixth position in which the relay 55 is energized through contacts 107, conductor 82, contact 80, controller segments, and contact 77. As previously explained, energization of the relay 55 energizes the trip coil 45 of the circuit breaker 43 to disconnect the capacitor bank 40 from the line. At the same time opening of the contact 104 of the relay 55 deenergizes the relay 67, while closing of the contacts 109 completes a circuit from the line 60 through the conductor 110 to the relay 69 to maintain it energized until the breaker has operated. As soon as the breaker opens, its auxiliary contacts 85 open and deenergize the relay 55, allowing it to drop out and deenergize the relay 69 by opening the contacts 109. The capacitor banks 41 and 42 only are now connected to the line 120.

If the line voltage now increases further or remains high, the contacts 65 are closed, and the relays 67 and 69 are successively energized, as described above, to cause the controller 58 to be moved back to the fifth position, in which the relays 52 and 56 are energized through the contacts 74 and 78. As previously described, energization of the relay 52 causes the circuit breaker 43 to close to again connect the capacitor bank 40 to the line, while energization of the relay 56 causes it to close its contacts 102 to cause tripping of the circuit breaker 46 to disconnect the capacitor bank 41 from the line. Energization of the relays 67 and 69 is controlled by the auxiliary contacts 104 and 109 of the relay 56 which correspond to those of the relay 55. Thus the capacitor banks 40 and 42 are now connected to the line to give a lower value of capacity.

If the voltage still remains high, or rises as a result of decrease in load, the controller 58 is moved back to the fourth position, in which the relay 55 is again energized to cause tripping of the circuit breaker 43 to disconnect the capacitor bank 40 from the line. The capacitor bank 42 of largest capacity is now connected to the line alone.

If the voltage again rises, or if it remains high, the controller 58 is moved to its third position, in which the relays 53 and 57 are energized. As previously described, energization of the relay 53 causes the circuit breaker 46 to close. Energization of the relay 57 causes it to close its contacts 111 and energizes the trip coil 51 of the circuit breaker 49, thus causing the breaker to open and disconnect the capacitor bank 42 from the line. The relay 57 also has auxiliary contacts 104 and 109 corresponding to those of the relays 55 and 56, which control the energization of the relays 67 and 69 in the manner already described. The capacitor bank 41 of intermediate capacity is now connected to the line alone.

If the voltage still remains high, or again rises, the controller is moved to its second position, in which the relays 52 and 56 are energized. As previously described, energization of the relay 52 causes the circuit breaker 43 to close, connecting the capacitor bank 40 to the line, while energization of the relay 56 causes tripping of the circuit breaker 46 to disconnect the capacitor bank 41 from the line, so that the capacitor bank 40 of smallest capacity is now connected to the line alone.

If the voltage still remains high, or rises as a result of further decreases in load, the controller 58 is moved back to its first position in which the relay 55 is energized to cause tripping of the circuit breaker 43 to disconnect the capacitor bank 40 from the line, leaving all three capacitor banks disconnected.

It will be seen, therefore, that with decreasing load, the system operates to disconnect and connect the capacitor banks in the reverse sequence to that followed with increasing load, giving decreasing amounts of capacitance. It should now be clear that the operation of this system insures the correct amount of capacitance to maintain the desired compensation for the reactive component of the load under any condition of load over a wide range of variation. It is to be understood, of course, that it is not necessary for the system to go through its entire range from minimum to maximum capacity before reversing its operation, as described above, but that at any time, in any position of the controller, it may move in either direction, depending on whether the line voltage increases or decreases as a result of the changes in load. It will be seen, therefore, that the system is operative to maintain the desired power factor at all times and under all conditions of load. Since the effect of connecting and disconnecting the capacitor banks as the load changes is to keep the line voltage reasonably constant, this system may also be used as a voltage regulator in some cases.

It should now be apparent that a control system has been provided for controlling a plurality of capacitor banks to connect them to a transmission or distribution system as needed to correct the power factor in accordance with varying loads on the system. It will be understood, of course, that the system shown and described is capable of many modifications and embodiments. Thus it may be made responsive to any electrical condition of the system which is affected by the load, and it may be applied to the control of any number of capacitor banks on either single-phase or polyphase systems. Any desired sequence of operation may be obtained by arranging the control device to cause energization of the closing and tripping relays in the proper order to effect the necessary switching operations.

It is to be understood, therefore, that although a specific embodiment of the invention has been described above, it is not limited to the exact arrangements shown, but in its broadest aspects it includes all equivalent embodiments and modifications which come within the scope of the appended claims.

I claim as my invention:

1. In combination with an electrical transmission or distribution line, a plurality of capacitor banks, switch-means for each of said capacitor banks for connecting it to the line, a closing relay-means and a tripping relay-means for each of said switch-means for effecting the operation thereof, controller-means for determining the energization of said closing and tripping relay-means in a predetermined sequence, and means responsive to an electrical condition of the line for energizing said closing and tripping relay-means through said controller-means and for actuating said controller-means.

2. In combination with an electrical transmission or distribution line, a plurality of capacitor banks, switch-means for each of said capacitor banks for connecting it to the line, a closing relay-means and a tripping relay-means for each of said switch-means for effecting the operation thereof, controller-means for determining the energization of said closing and tripping relay-means in a predetermined sequence, and means, including time-delay relay-means, and responsive to an electrical condition of the line, for energizing said closing and tripping relay-means through said controller-means and for actuating said controller-means.

3. In combination, a plurality of capacitor banks of different capacities, switch-means for each of said capacitor banks for connecting it to an alternating current line, a closing relay-means and a tripping relay-means for each of said switch-means for effecting the operation thereof, controller-means for determining the energization of said closing and tripping relay-means in a predetermined sequence to effect sequential connection of said capacitor banks to the line one at a time in order of increasing capacity and then in combinations of two or more of increasing capacity or to effect disconnection of said capacitor banks in the reverse sequence, and means responsive to an electrical condition of the line for energizing said closing and tripping relay-means through said controller-means and for actuating said controller-means.

4. In combination, a plurality of capacitor banks of different capacities, switch-means for each of said capacitor banks for connecting it to an alternating current line, a closing relay-means and a tripping relay-means for each of said switch-means for effecting the operation thereof, controller-means for determining the energization of said closing and tripping relay-means in a predetermined sequence to effect sequential connection of said capacitor banks to the line one at a time in order of increasing capacity and then in combinations of two or more of increasing capacity or to effect disconnection of said capacitor banks in the reverse sequence, a first time-delay relay-means, a second time-delay relay-means, said time-delay relay-means having contacts for effecting the completion of energizing circuits for said closing and tripping relay-means through said controller-means and for effecting actuation of said controller-means, the first and second time-delay relay-means causing actuation of the controller-means in opposite senses, and means responsive to an electrical condition of the line for alternatively energizing the one or the other of said time-delay relay-means.

5. In combination, a plurality of capacitor banks, switch-means for each of said capacitor banks for connecting it to an alternating current line, a closing relay-means and a tripping relay-means for each of said switch-means for effecting the operation thereof, a first time-delay relay-means, a second time-delay relay-means, said time-delay relay-means having contacts for effecting the completion of circuits for energizing said closing and tripping relay-means, a movable controller-device having contacts in said energizing circuits between said time-delay relay-means and said closing and tripping relay-means for determining the energization and deenergization of the closing and tripping relay-means in a predetermined sequence, the first time-delay relay-means having contacts for effecting movement of said controller-device in one direction and the second time-delay relay-means having contacts for effecting movement of the controller-device in the opposite direction, and means responsive to an electrical condition of the line for alternatively energizing the one or the other of said time-delay relay-means.

6. In combination, a plurality of capacitor banks, switch-means for each of said capacitor banks for connecting it to an alternating current line, a closing relay-means and a tripping relay-means for each of said switch-means for effecting the operation thereof, a first time-delay relay-means, a second time-delay relay-means, said time-delay relay-means having contacts for effecting the completion of circuits for energizing said closing and tripping relay-means, a movable controller-device having contacts in said energizing circuits between said time-delay relay-means and said closing and tripping relay-means for determining the energization and deenergization of the closing and tripping relay-means in a predetermined sequence, the first time-delay relay-means having contacts for effecting movement of said controller-device in one direction and the second time-delay relay-means having contacts for effecting movement of the controller-device in the opposite direction, means responsive to an electrical condition of the line for alternatively energizing the one or the other of said time-delay relay-means, and means including interconnections between said closing and tripping relay-means and said time-delay relay-means for effecting deenergization of all said relay-means upon the completion of each operation of said switch-means.

WILLIAM H. CUTTINO.